Sept. 20, 1955 G. L. DAVIS 2,718,282
SPRING TENSIONER
Filed July 20, 1953 2 Sheets-Sheet 1

INVENTOR.
George Lee Davis
BY
ATTORNEY.

Sept. 20, 1955  G. L. DAVIS  2,718,282
SPRING TENSIONER

Filed July 20, 1953  2 Sheets—Sheet 2

INVENTOR.
George Lee Davis
BY
ATTORNEY.

United States Patent Office 2,718,282
Patented Sept. 20, 1955

2,718,282
SPRING TENSIONER

George Lee Davis, Kansas City, Mo.

Application July 20, 1953, Serial No. 368,935

7 Claims. (Cl. 185—39)

The present invention has to do with a new and improved tool for tensioning springs, and has for its primary object the provision of structure capable of developing sufficient power when attached to one end of a coil spring and upon manipulation, to place as much tension in the spring as desired prior to fastening the spring to structure which it operates such as a rotatable shaft.

There are many applications of coil springs wherein the latter must be tensioned prior to placing the apparatus with which it is used, into use. A specific example of such arrangement is in the case of garage doors and the like, particularly the overhead-type. The mechanism for operating the door includes an elongated, rotatable shaft upon which a spring is coiled, one end of the spring being initially attached to a rigid part and the opposite end being secured to the shaft for rotating it in one direction after the spring is tensioned. Heretofore it has been necessary to tension the spring through a manual operation that is slow and difficult and the elimination of such problems constitutes the primary object of this invention.

Another object hereof is to provide a spring tensioner that includes a slotted element such as a ratch that may be slipped over the shaft upon which the coil is mounted, together with manually operable members having spring-loaded pawls as a part thereof and cooperable with the ratch for tensioning the spring when releasably coupled therewith.

Other objects include many important details of construction, all of which will be made clear as the following specification progresses, reference being had to the accompanying drawing, wherein.

Figure 1:
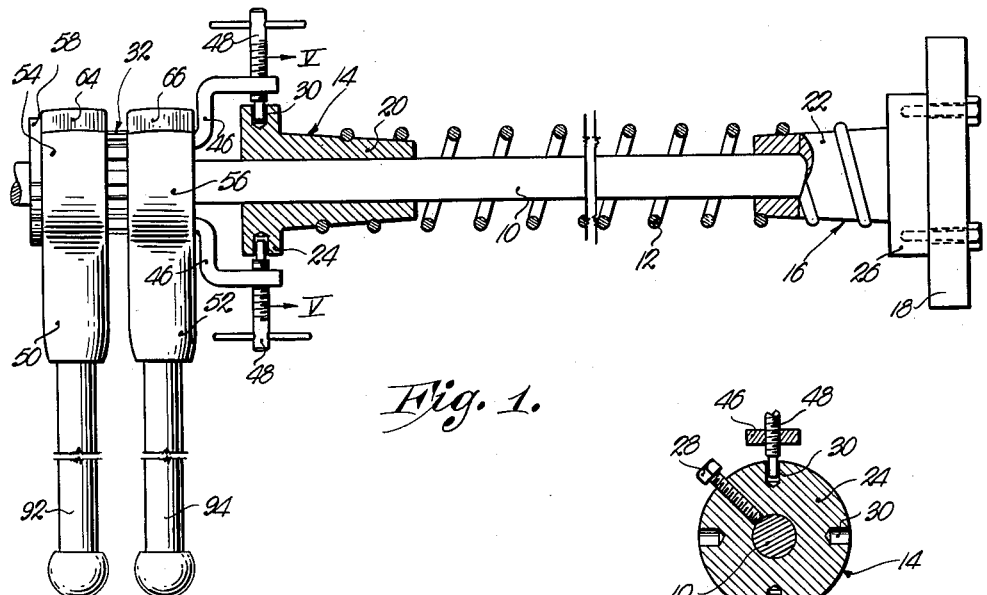
Figure 1 is an elevational view of a spring tensioner made pursuant to the present invention showing the same operably mounted upon a shaft and coupled with the spring to be tensioned.
Figure 5:
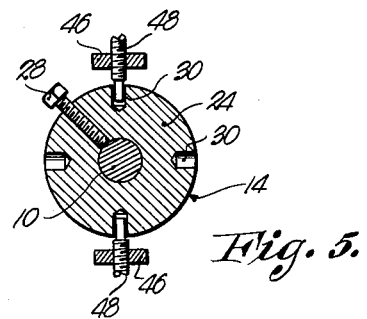
Fig. 5 is a fragmentary, detailed, cross-sectional view taken on line V—V of Fig. 1.

The spring tensioner shown in the drawings is adapted for mounting upon an elongated shaft 10 as shown in Figs. 1 and 5 to tension a spring 12 coiled upon the shaft 10 by means of an operable connection with a plug 14 that is in turn connected with the spring 12 at one end thereof. The spring-shaft assembly chosen for illustration in Figs. 1 and 5, contemplates that the shaft 10 shall be freely rotatable within a second plug 16, that is in turn rigidly secured to a suitable support 18.

Plugs 14 and 16 are provided with tapered portions 20 and 22 respectively, extending into the proximal ends of the spring 12, the latter being secured to the plugs 14 and 16 in any suitable manner such as by threaded engagement therewith as illustrated in Fig. 1.

Plugs 14 and 16 are additionally provided with annular, outturned flanges 24 and 26 respectively, and the plug 14 is normally secured to the shaft 10 for rotation therewith by one or more radial setscrews 28 within the flange 24 as shown in Fig. 5. The flange 24 is additionally provided with a number of radial sockets 30 for facilitating tensioning of the spring 12. Conventionally, a pair of rods are utilized in the sockets 30 to rotate the plug 14 and thereby tension the spring 12 after loosening of setscrew 28, whereupon the latter is tightened against the shaft 10 as shown in Fig. 5.

The improved spring tensioner forming the subject matter hereof, includes an elongated ratch element broadly designated by the numeral 32, having a continuous longitudinal bore 34 therethrough adapted to receive the shaft 10 in the manner illustrated by Figs. 1 and 5. Ratch element 32 is provided with a plurality of longitudinal teeth 36 throughout the circumference thereof and with a slot 38 coextensive in length therewith communicating with the bore 34 and of sufficient width to receive the shaft 10 to eliminate the necessity of threading the ratch member 32 upon the shaft 10 from one end of the latter. An elongated, removable section 40 forming a part of the ratch element 32 is fittable within the slot 38 and an interlocking connection is provided for by means of opposed, longitudinally extending slots 42 within the walls of the ratch member 32 forming the slot 38, and opposed longitudinally extending ribs 44 on the section 40 and slidable within the grooves 42.

The ratch member 32 is adapted for releasable connection with the plug 14 by means of a pair of diametrically opposed Z-shaped brackets 46 rigid to the ratch element 32 at one end thereof and properly spaced to embrace the flange 24 as shown in Figs. 1 and 5. One means of releasably joining the brackets 46 with the flange 24 is by provision of T-shaped screws 48 having their innermost ends adapted for fitting within a pair of diametrically opposed sockets 30 of the flange 24.

Structure for rotating the ratch 32 and holding the same against retrograde movement, includes a pair of heads 50 and 52 of identical nature and including substantially C-shaped collars 54 and 56 respectively, rotatably mounted on the ratch element 32 between the brackets 46 and a C-shaped retainer ring 58. Ring 58 has a notch 60 sufficiently large to receive the shaft 10, and registering directly with the slot 38 when the ring 58 is secured to the ratch element 32 by one or more fastening elements 62. By virtue of the C-shaped nature of the collars 54 and 56, there are presented shaft clearance openings 64 and 66 respectively, of the same size as the notch 60 and equal to the width of the slot 38 for clearing the shaft 10.

Figure 4:
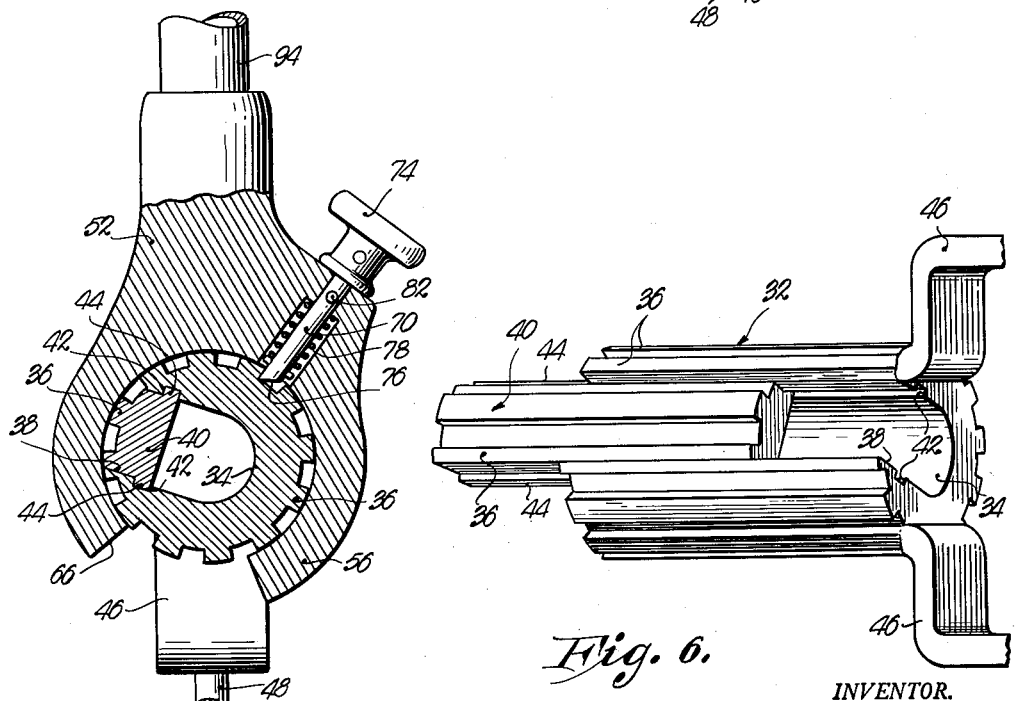
Fig. 4 is a fragmentary, cross-sectional view taken on line IV—IV of Fig. 3.
Figure 6:
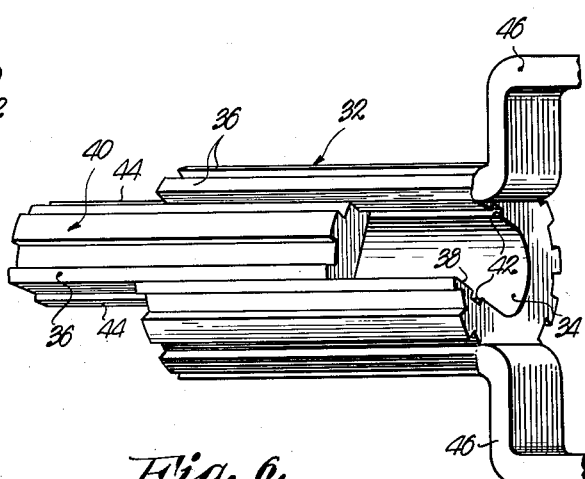
Fig. 6 is a fragmentary, perspective view showing the ratch member with the manually operable levers removed therefrom.
Figure 2:
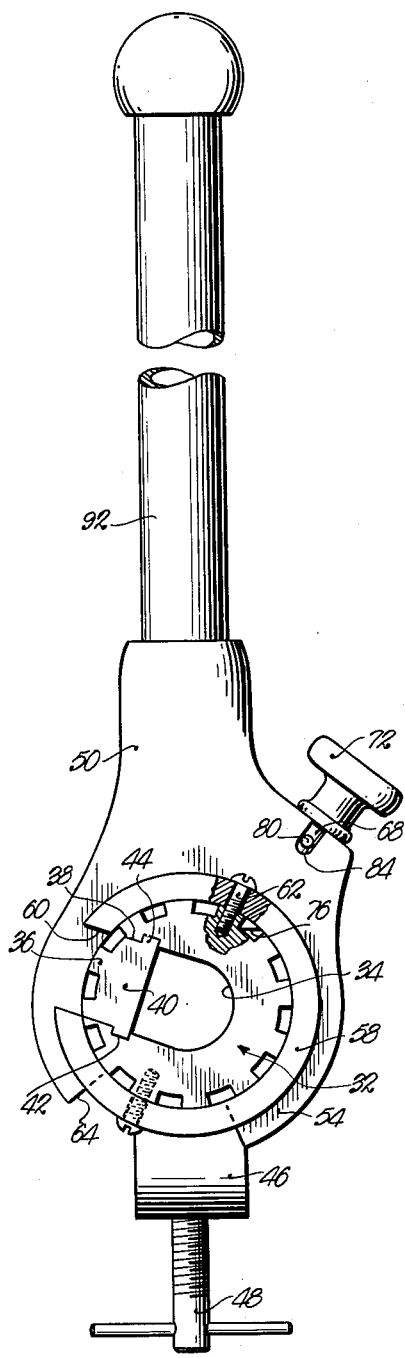
Fig. 2 is an enlarged, end elevational view of the spring tensioner removed from the shaft, parts being broken away for clearness.
Figure 3:
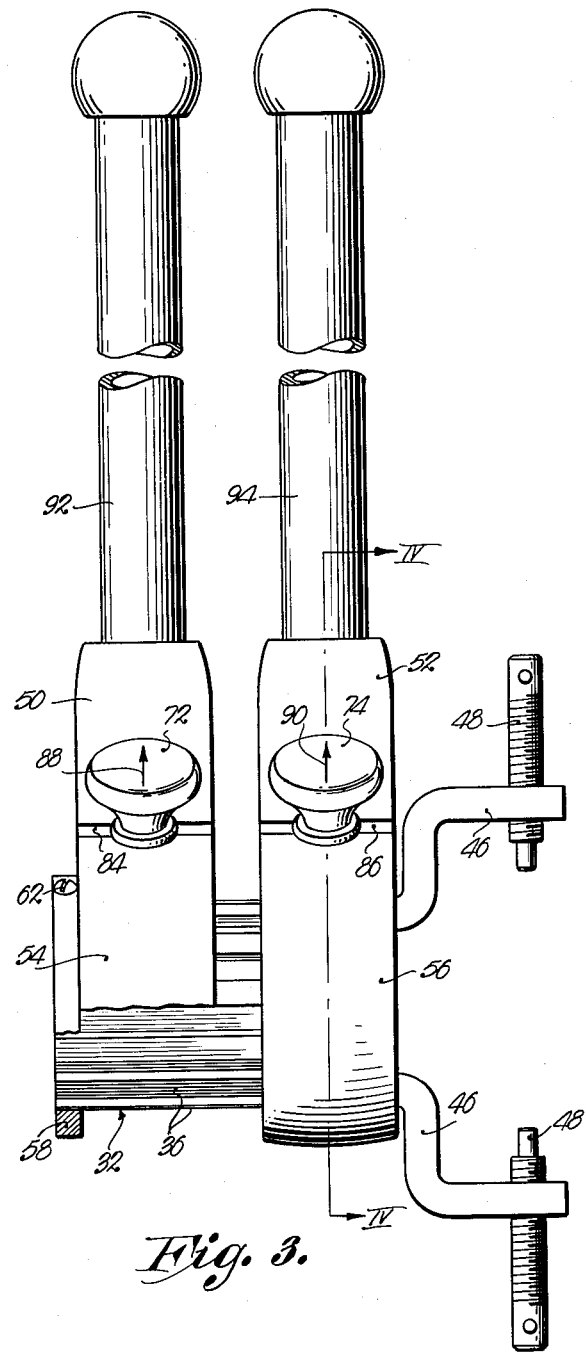
Fig. 3 is a side elevational view thereof, parts being broken away to reveal details of construction.

The heads 50 and 52 are provided with spring-loaded pawls 68 and 70 respectively, having operating buttons 72 and 74 respectively. Each of the pawls is made as illustrated in Fig. 4 and includes a beveled, innermost end 76 engageable with the teeth 36 of ratch element 32. A spring 78 coiled thereabout yieldably holds the same biased toward the element 32. Cross pins 80 and 82 are formed on the pawls 68 and 70 respectively and are fittable within grooves 84 and 86 in the heads 50 and 52.

Indicating arrows 88 and 90 are provided on the buttons 72 and 74 and handles 92 and 94 extend radially from the heads 50 and 52.

It is obvious as above indicated that when the spring tensioner hereof is to be placed in use, it is unnecessary to thread the same upon the shaft 10 from one end thereof.

Such manner of mounting would be impossible in many instances and particularly in the case of shafts 10 for overhead garage doors because that end of the shaft 10 opposite to the plug 16 is normally not exposed for permitting the threaded manner of mounting.

It is but necessary to turn the collars 54 and 56 on the ratch element 32 by manipulation of handles 92 and 94, to align the openings 64 and 66 with the slot 38 and with the notch 60 and to remove the section 40, whereupon the entire tool may be slipped over the shaft 10 adjacent the plug 14 as shown in Fig. 1. The section 40 is thereupon replaced within the slot 38, screws 48 aligned with the sockets 30 and the brackets 46 attached to the flange 24 by rotating the screws 48 until the same extend into a pair of the sockets 30 as shown in Fig. 5.

Thereupon, the spring 12 may be tensioned after loosening of setscrew 28, by manipulation of the two handles 92 and 94. The pawls 68 and 70 will readily yield against the action of their springs 78 upon rotation of the heads 50 and 52 in one direction and engage the teeth 36 to rotate the ratch element 32 on the shaft 10 when the handles 90 and 92 are alternately swung in the opposite direction.

Consequently, one of the handles 92—94 functions when the tool is placed in use, as the means to rotate the plug 14 and the other handle 92—94 and its associated parts, operate to hold the plug 14 against retrograde rotation. After the spring 12 is tensioned as desired, the screw 28 is set against the shaft 10 and the tool removed.

If the spring 12 is of such nature to require rotation of the plug 14 in the opposite direction in order to tension spring 12, the operator need merely reverse the pawls 68 and 70 by manipulation of buttons 72 and 74. These buttons are pulled outwardly against the springs 78 so that the pins 80 and 82 clear grooves 84 and 86, the pawls 68 and 70 thereupon rotated 180 degrees and the pins 80 and 82 re-inserted in the grooves 84 and 86. The arrows 88 and 90 indicate to the user the position of the beveled ends 76 with respect to the teeth 36. It is seen further that by virtue of the reversibility of pawls 68 and 70, the tool may be used equally as well in removing the tension on spring 12 if for any reason the apparatus with which it is used, is to be repaired or disassembled.

Having thus described the invention what is claimed as new and desired to be secured by Letters Patent is:

1. A tool for tensioning a spring coiled on a shaft, and provided with clamps on the ends thereof for fastening the same to the shaft, said tool comprising a cylindrical element provided with a shaft-receiving bore; releasable means for connecting the element to one of said clamps; a first member rotatable on the element and provided with means engageable with said element for rotating the latter on the shaft; and a second member rotatable on the element and provided with means engageable with the element for holding the latter against retrograde movement on the shaft, said members each having a manually operable handle disposed radially of the element.

2. A tool for tensioning a spring coiled on a shaft, and provided with clamps on the ends thereof for fastening the same to the shaft, said tool comprising a cylindrical ratch element provided with a shaft-receiving bore; releasable means for connecting the element to one of said clamps; a first member rotatable on the element and provided with a pawl engageable with said element for rotating the latter on the shaft; and a second member rotatable on the element and provided with means engageable with the element for holding the latter against retrograde movement on the shaft, said members each having a manually operable handle disposed radially of the element.

3. A tool for tensioning a spring coiled on a shaft, and provided with clamps on the ends thereof for fastening the same to the shaft, said tool comprising a cylindrical ratch element provided with a shaft-receiving bore, said element including a pair of sections, one of the sections having a shaft-clearance slot communicating with the bore, there being a joint releasably mounting the other section within said slot; releasable means on one end of said element for connecting the element to one of said clamps; a first member rotatable on the element and provided with a pawl engageable with said element for rotating the latter on the shaft; a second member rotatable on the element and provided with a pawl engageable with the element for holding the latter against retrograde movement on the shaft, said members each having a manually operable handle disposed radially of the element; and a retainer ring secured to the element at the opposite end thereof cooperating with said releasable means in maintaining said members on the element and provided with a shaft clearance notch in alignment with said slot, each member being provided with a shaft-clearance opening registrable with the slot and the notch.

4. A tool for tensioning a spring coiled on a shaft, and provided with clamps on the ends thereof for fastening the same to the shaft, said tool comprising a cylindrical ratch element provided with a shaft-receiving bore; releasable means for connecting the element to one of said clamps; a first member rotatable on the element and provided with a pawl engageable with said element for rotating the latter on the shaft; and a second member rotatable on the element and provided with a pawl engageable with the element for holding the latter against retrograde movement on the shaft, said members each having a manually operable handle disposed radially of the element.

5. A tool as set forth in claim 1 wherein said element includes a pair of sections, one of the sections having a shaft-clearance slot communicating with the bore, the other section being removably mounted within the slot.

6. A tool as set forth in claim 5 wherein each member is provided with a shaft-clearance opening registrable with the slot.

7. A tool as set forth in claim 4 wherein each member is provided with means for holding the pawls thereof in either of two positions relative to the element whereby the latter may be rotated in either of two directions.

References Cited in the file of this patent
UNITED STATES PATENTS

| | | |
|---|---|---|
| 920,098 | Taylor | Apr. 27, 1909 |
| 973,045 | Hobbs | Oct. 18, 1910 |
| 986,695 | Cunningham | Mar. 14, 1911 |
| 1,332,870 | Gill | Mar. 2, 1920 |